United States Patent [19]

Noetzel

[11] 4,166,161
[45] Aug. 28, 1979

[54] FLAME-RETARDING, EXPANDABLE MOLDING COMPOSITIONS OF STYRENE POLYMERS

[75] Inventor: Siegfried Noetzel, Kelkheim, Fed. Rep. of Germany

[73] Assignee: Hoechst Aktiengesellschaft, Frankfurt am Main, Fed. Rep. of Germany

[21] Appl. No.: 909,389

[22] Filed: May 25, 1978

[30] Foreign Application Priority Data

May 27, 1977 [DE] Fed. Rep. of Germany ....... 2724062

[51] Int. Cl.$^2$ ................................................ C08J 9/12
[52] U.S. Cl. ............................. 521/96; 260/DIG. 24; 521/58; 521/98; 521/146; 521/907

[58] Field of Search .......................... 521/96, 98, 146; 260/45.7 RL

[56] References Cited

U.S. PATENT DOCUMENTS 3,819,547  6/1974  Pilbar et al. .................. 260/45.7 RL

*Primary Examiner*—Morton Foelak
*Attorney, Agent, or Firm*—Curtis, Morris & Safford

[57] ABSTRACT

There are described expandable molding compositions of styrene polymers containing 1,2,3,4,5,6-hexabromohexene-1 or 1,2,3,4,5,6-hexabromohexene-3 or mixtures thereof as the flame-retarding agent, and showing a favorable combination of improved properties, especially high pre-foaming velocity, good welding, rapid mold-releasing and good flame-retardance.

6 Claims, No Drawings

FLAME-RETARDING, EXPANDABLE MOLDING COMPOSITIONS OF STYRENE POLYMERS

Imparting flame-retarding properties to expandable styrene polymers by means of halogens or halogeno compounds, is a known practice. Especially useful for this purpose are bromine or bromine compounds. 2–4 weight % of bromine in the expandable styrene polymers are already sufficient, while a quantity of 20 to 30 weight % of chlorine would be necessary for the same effect.

The bromine compounds may be added to the monomer styrene during the polymerization (German Auslegeschrift No. 1,002,125) or, as well, to the expandable polystyrene beads; solvents or dispersing agents have been used for a better or more even distribution of the bromine compounds (German Auslegeschrift No. 1,067,586). This (dibromopropyl)phosphate, brominated aliphatic or cycloaliphatic oligomers of butadiene, saturated and unsaturated bromine compounds of cycloaliphatic hydrocarbons having 12 carbon atoms (German Auslegeschriften Nos. 1,046,313, 1,218,149, 1,128,975) are especially useful bromine compounds for imparting flame proof properties to expandable styrene polymers. These compounds lead to useful flame-proof, expandable styrene polymers, but they have the inconvenience of requiring quantities which reduce the welding properties of the pre-foamed polystyrene beads and degrade the cellular structure of the molded articles prepared therefrom. Moreover, the bromine compounds dissolve with difficulty or to only a small extent in the hydrocarbons to be used as expanding agents, so that it is very difficult to obtain a homogeneous distribution in the polymer particles according to the impregnating process.

It is known that the mold release properties may be improved with very small quantities of brominated aliphatic or cycloaliphatic oligomers of butadiene (German Auslegeschrift No. 1,256,888). The same result may be obtained by incorporating by polymerization small amounts of bromine-containing monomers into the expandable polystyrene (German Auslegeschrift No. 1,282,935), but it is not possible to thereby impart sufficient flame-proofing properties and a satisfactory welding capacity to the pre-foamed polystyrene beads.

It is also known to use hexabromobutene-2 for imparting flame-proof properties to expandable styrene polymers (German Offenlegungsschrift No. 2,430,623). This bromine compound imparts to the expandable styrene polymers good flame-retarding properties; however, said compound has the disadvantage that pre-foamed polystyrene beads containing it are rapidly lose the expanding agent and have poor welding properties.

The use of 1,2,3,4-tetrabromobutane as flame-retarding agent of styrene polymers is also known. However, its use in expandable styrene polymers imparts neither sufficiently flame-proof nor rapid mold-releasing properties of shaped articles manufactured therefrom.

The objective of the present invention was to find an organic bromine compound, small quantities of which result in a flame-retarding finish as good as provided according to the state of the art and in a better welding capacity of the pre-foamed polystyrene particles, and which are suitable for preparing rapidly mold-releasable cellular bodies. Moreover, the pre-foamable polystyrene particles should reach a high pre-foaming velocity and an elevated throughput in the pre-foaming device.

It has been found that the result aimed at may be achieved, when the expandable styrene polymers contain as organic bromine compounds 1,2,3,4,5,6-hexabromohexene-1 or 1,2,3,4,5,6-hexabromohexene-3 or mixtures of these compounds in such a quantity that the bromine content is from 0.1 to 5 weight %, calculated on the styrene polymer.

Preference is given to the use of mixtures of said bromine compounds.

The preferred quantity in which the hexabromohexenes and mixtures thereof are used, is such that the bromine content is from 0.5 to 1.5 weight %, calculated on the styrene polymer.

The hexabromohexenes to be used according to the invention may be obtained by adding 6 bromine atoms to hexa-3,5-diene-1-ine (1-ethinyl-butadiene-1,3) or hexa-1,5-diene-3-ine (divinyl-acetylene). These hexadienines may be prepared by introducing acetylene into an aqueous solution of copper-I-chloride, ammonium chloride and hydrogen chloride, in the presence of copper, at a temperature of from 25° to 65° C. Both hexabromohexenes occur as cis- and trans-compounds, which may both be used according to the invention.

No patent protection is claimed for preparing the bromine compounds to be used according to the invention.

Polymers containing said hexabromohexenes according to the present invention are expandable styrene homopolymers or copolymers with $\alpha$-methyl styrene, with styrenes halogenated in the nucleus such as 2,4-dichlorostyrene, with acrylonitrile, methacrylonitrile, esters of $\alpha,\beta$-unsaturated carboxylic acids with alcohols having 1–8 carbon atoms such as acrylic acid ester or methacrylic acid ester as well as with vinyl carbazole. The comonomers are incorporated in the styrene copolymers by not more than 50 weight %.

Besides, the expandable styrene polymers may also contain very small amounts—of 0.001 to about 1 weight %—of polymers forming a separate phase in the styrene polymer, for example polyolefins such as polyethylene, polypropylene, polybutene or elastomer polymers, such as polybutadiene, rubber-like butadiene-styrene-copolymers or polysiloxanes or ethylene-vinyl acetate-copolymers.

The foamable styrene polymers contain as expanding agents the usual gaseous or liquid organic compounds which do not dissolve the styrene polymer or which merely swell the styrene polymer, and the boiling point of which is below the softening point of the polymers.

Such compounds are, for example, aliphatic hydrocarbons such as propane, butane, pentane, hexane, cycloaliphatic hydrocarbons such as cyclohexane, furthermore halogenated hydrocarbons such as dichlorodifluoromethane, 1,2,2-trifluoro-1, 1,2-trichloroethane. There may also be used mixtures of these compounds.

Solvents such as methanol or ethanol, in admixture with hydrocarbons may as well be used optionally as expanding agents.

It is also possible to use so-called solid expanding agents as pore control agents, for example a mixture of sodium-hydrogen-carbonate with an organic acid such as citric acid, or with boric acid.

The expanding agents are used in quantities of from 3 to 15 weight %, preferably from 5 to 7 weight %, calculated on the polymer.

A special advantage of the compounds to be used according to the invention resides in the fact that they dissolve well in the hydrocarbons or halogenated hydrocarbons employed as expanding agents and that they can be distributed homogeneously in the polymer particles by impregnation, without problems.

Therefore, the hexabromohexenes are preferably incorporated into the styrene polymer beads by adding them, towards the end or after completion of the bead polymerization (suspension polymerization) or after suspension of already isolated polystyrene beads, to the aqueous suspension, as solution in the expanding agent, and by impregnating the polymer particles with this solution at a temperature of from 50° to 150° C.

However, it is also possible to incorporate the bromine compounds to be used according to the invention into the polymer either during the polymerization which is preferably carried out as suspension polymerization in the presence of usual activators such as peroxides or azoactivators, and of suspension stabilizers such as tricalcium phosphate, anionic emulsifiers such as sodium lauryl sulfate, Na-dodecyl benzene sulfonate and other, or in the presence of organic dispersing agent such as polyvinyl pyrrolidone, polyvinyl alcohol or hydroxy ethyl cellulose, and in the presence of one of the afore-mentioned expanding agents, in aqueous suspension.

The hexabromohexenes may as well be added to the polymerization batch already before the suspension polymerization is started.

It is also possible to coat the expandable styrene polymer beads with the hexabromohexenes according to known processes.

It is also possible to use the bromine compounds to be used according to the invention together with known synergic agents, for example organic peroxides such as di-tert.-butyl peroxide, dicumyl peroxide, di-tert.-butyl perbenzoate, or with organic radical forming agents such as phenyl-substituted ethanes, disulfides, azo compounds and hydrazine derivatives, quinone dioximes, benzthiazol sulfonamides.

The flame-retarding action of the hexabromohexenes may be further enhanced by adding optionally brominated phosphorus compounds such as esters of the phosphonic or phosphinic acid, phosphinoxides and by adding antimony compounds such as $Sb_2O_3$ and organic antimonyl compounds.

Preference is given to the use of an organic peroxide, especially of such a one having a half-life value of at least 2 hours at 100° C. (in benzene), as synergic agent.

When using such synergic agents, the bromine content in the expanding agent-containing styrene polymer may amount to 0.05 to 0.7 weight %, especially 0.2 to 0.5 weight %, calculated on the styrene polymer.

The expandable polystyrene particles which are treated according to the invention with 1,2,3,4,5,6-hexabromohexene-1 and/or with 1,2,3,4,5,6-hexabromohexene-3 are distinguished by a combination of good qualities of the pre-foamed parts or perfectly-foamed cellular bodies thus obtained, namely high pre-foaming velocity, good welding, rapid mold-releasing and flame-retarding properties.

The following Examples illustrate the invention:

EXAMPLES

For carrying out the Examples, use was made of a mixture of about 80 weight % of 1,2,3,4,5,6-hexabromohexene-3 and about 20 weight % of 1,2,3,4,5,6-hexabromohexene-1. The mixture was obtained by introducing a solution of the mixture of hexa-1,5-diene-3-ine and hexa-3,5-diene-1-ine in carbon tetrachloride dropwise into a solution of bromine in carbon tetrachloride, at 10°–15° C. After the dropwise addition, the after-reaction was carried out at 60° C. The mixture of the hexabromohexenes crystallized upon cooling. The mixture was washed with $CCl_4$.

The mixture of the hexabromohexenes had a melting point of 103°–107° C. after recrystallization from chloroform/ethanol (3:1).

The mixture of hexadienines was obtained by introducing acetylene into an aqueous solution of CuCl, $NH_4Cl$ and HCl, circulating the first formed gaseous vinyl acetylene, then replacing the currently consumed acetylene and condensation from the gases which had been removed from the reaction mixture.

Pre-foaming the expanding agent-containing polystyrene beads was carried out as follows: The particles were foamed with a steam current at 100° C. for a period of 1 to 6 minutes, and the bulk density of the thus obtained foamed particles was determined after 1, 2, 3, 4, 5 and 6 minutes respectively.

After 24 hours of storage under air at room temperature, the prefoamed particles having a bulk density of 16 g/l were foamed with steam in steel molds (10×10×5 cm) having perforated lateral surfaces.

The flammability of the thus obtained shaped articles was determined as follows:

Two test specimens were obtained by cutting the shaped article to the dimension of each 30×30×100 mm; one was clamped vertically and the other was clamped horizontally into a frame and exposed there for 5 seconds to a non-luminous flame of a Bunsen burner of about 3 cm height. After removal of the flame the afterburning time was measured in seconds.

EXAMPLE 1

A 3 liter-metal autoclave was charged with
1.2 kg of styrene polymer beads,
160 ml of n-pentane
1.4 l of water
70 ml of a polyvinyl-alcohol solution (2% strength) (residual ester content about 10%)
6 g of dodecyl benzene sulfonate-Na
14 g of tricalcium phosphate having a particle size of 1 to 8/μ, and
24 g of a 1,2,3,4,5,6-hexabromohexene mixture (2 weight %, calculated on polystyrene).

The closed autoclave was agitated at 110° C. for 8 hours. After cooling and opening the autoclave, the foamable polystyrene beads were filtered off, washed free from phosphate and dried for one hour at 30° C. in a drying cabinet. 25 ml of the thus obtained polystyrene beads were treated in a 5 liter-steam apparatus for a period of 1, 2, 3, 4, 5 and 6 minutes each and the bulk density (in g/l) was determined. The pre-foamed polystyrene beads were stored for 24 hours and then welded in a perforated steel mold (10×10×5 cm) under the action of steam. Test specimens (30×30×100 mm) were cut out of the foam articles stored for at least 24 hours, the test specimens were then subjected to the above-described fire-tests.

The Table shows the results.

EXAMPLE 2

The procedure of Example 1 was repeated, but instead, of 24 g of a 1,2,3,4,5,6-hexabromohexene mixture there were used 12 g of this mixture and 3.6 g of dicumyl peroxide as synergic agent.

COMPARATIVE EXAMPLE 1

The procedure of Example 1 was repeated, but instead of the 1,2,3,4,5,6-hexabromohexene mixture there were used 24 g of hexabromobutene-2 (2 weight %, calculated on styrene).

COMPARATIVE EXAMPLE 2

The procedure of Example 1 was repeated but instead of the mixture of 1,2,3,4,5,6-hexabromohexenes there were used 12 g of hexabromobutene-2 and 3.6 g of dicumyl peroxide as synergic agent.

COMPARATIVE EXAMPLE 3

The procedure of Example 1 was repeated, but instead of the mixture of 1,2,3,4,5,6-hexabromohexene there were used 26.4 g of 1,2,5,6,9,10-hexabromocyclododecane.

COMPARATIVE EXAMPLE 4

The procedure of Example 1 was repeated, but instead of the mixture 1,2,3,4,5,6-hexabromohexenes there were used 13.2 g of 1,2,5,6,9,10-hexabromocyclododecane and 3.6 g of dicumyl peroxide as synergic agent.

TABLE

| Example No. | bromine compound | quantity % | synergic agent | quantity % | flame test after burning time (seconds) vertical | flame test after burning time (seconds) horizontal | pre-foaming time for bulk density of 16 g/l (min.) |
|---|---|---|---|---|---|---|---|
| Ex. 1 | 1,2,3,4,5,6-hexabromohexene mixture | 2 | — | — | 18 | 16 | 3 |
| Ex. 2 | " | 1 | dicumylperoxide | 0.3 | 6 | 5 | 2 |
| Compar. Ex. 1 | hexabromobutene-2 | 2 | — | — | 16 | 15 | beads collapse after prefoaming, bulk density is not achieved |
| Compar. Ex. 2 | " | 1 | dicumylperoxide | 0.3 | 7 | 6 | beads collapse after prefoaming, bulk density is not achieved |
| Comp. Ex. 3 | 1,2,5,6,9,10-hexabromocyclododecane | 2.2 | — | — | >25 | >25 | 2 |
| Comp. Ex. 4 | " | 1.1 | dicumylperoxide | 0.3 | >25 | >25 | 2 |

What is claimed is:

1. Flame-resistant, expandable molding composition of styrene polymers containing 1,2,3,4,5,6-hexabromohexene-1 or 1,2,3,4,5,6-hexabromohexene-3 or a mixture thereof in such a quantity that the bromine content is from 0.1 to 5, preferably from 0.5 to 1.5 weight %, calculated on the styrene polymer.

2. Flame-resistant, expandable molding composition according to claim 1, which contains, in addition to the flame-retarding agent, an organic peroxide, especially such a one having a half-life period of at least 2 hours at 100° C. (in benzene).

3. A process for preparing flame resistant, expandable molding compositions of styrene polymers by polymerization of styrene, optionally together with one or several comonomers in aqueous suspension, in the presence of an organic bromine compound as flame-retarding agent, which comprises the use of 1,2,3,4,5,6-hexabromohexene-1 or 1,2,3,4,5,6-hexabromohexene-3 or a mixture thereof, as organic bromine compound.

4. A process for preparing flame-resistant, expandable molding compositions according to claim 3, which comprises the addition of the hexabromohexene(s), as solution in the expanding agent, to the aqueous suspension towards the end of or after the suspension polymerization and the impregnation of the polymer particles with this solution at a temperature of from 50° to 150° C.

5. The use of 1,2,3,4,5,6-hexabromohexene-1 or 1,2,3,4,5,6-hexabromohexene-3 or of a mixture thereof as fire-proofing agent for preparing flame-resistant, expandable molding compositions of styrene polymers.

6. Molding composition as defined in claim 2, in which the organic peroxide has a half-life of at least two hours at 100° C. (in benzene).